US012578625B2

(12) United States Patent
Sato

(10) Patent No.: US 12,578,625 B2
(45) Date of Patent: Mar. 17, 2026

(54) LINEAR MOTOR, LENS BARREL INCLUDING LINEAR MOTOR, AND DRIVE DEVICE INCLUDING LINEAR MOTOR

(71) Applicant: CANON KABUSHIKI KAISHA, Tokyo (JP)

(72) Inventor: Kyosuke Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 690 days.

(21) Appl. No.: 18/067,409

(22) Filed: Dec. 16, 2022

(65) Prior Publication Data

US 2023/0205052 A1      Jun. 29, 2023

(30) Foreign Application Priority Data

Dec. 27, 2021      (JP) ................................. 2021-212512

(51) Int. Cl.
*G03B 13/34* (2021.01)
*G02B 7/04* (2021.01)
(Continued)

(52) U.S. Cl.
CPC .............. *G03B 13/34* (2013.01); *G02B 7/04* (2013.01); *G02B 7/08* (2013.01); *G03B 3/10* (2013.01); *G03B 3/12* (2013.01); *H02K 41/0354* (2013.01)

(58) Field of Classification Search
CPC . G03B 13/34; G03B 3/10; G03B 3/12; G02B 7/04; G02B 7/08; H02K 41/0354; H02K 41/0356; H02K 33/02; H02K 33/16
See application file for complete search history.

(56) References Cited

U.S. PATENT DOCUMENTS 4,792,935 A * 12/1988 Kime ................. H02K 41/0354
369/44.22
2018/0102681 A1  4/2018 Prüssmeier
2021/0333504 A1 10/2021 Fujinaka

FOREIGN PATENT DOCUMENTS

JP          07039129 A  *  2/1995
JP       H07039129 A      2/1995
(Continued)

OTHER PUBLICATIONS

Machine translation of JPH739129 (JP07039129) retrieved electronically from Global Dossier 10.3.2025 (Year: 1995).*
(Continued)

*Primary Examiner* — Cara E Rakowski
(74) *Attorney, Agent, or Firm* — Cowan, Liebowitz & Latman, P.C.

(57) ABSTRACT

A linear motor capable of improving power efficiency while preventing enlargement. A winding core direction of a coil coincide with a thrust direction of the linear motor. A center yoke is arranged inside the coil extending in the thrust direction. A magnet faces the center yoke outside the coil so that its magnetization direction is perpendicular to the thrust direction. A back yoke adjoins the main magnet at an opposite side of the center yoke. Two sub magnets adjoin the main magnet and their magnetization directions are inclined by 90° to that of the main magnet. Two side yokes adjoin the center and back yokes at both sides a magnet group in the thrust direction. Surfaces of the main magnet that adjoin the sub magnets incline inward toward the back yoke. Surfaces of the sub magnets that adjoin the main magnet incline inward toward the center yoke.

12 Claims, 16 Drawing Sheets

(51) Int. Cl.
  G02B 7/08      (2021.01)
  G03B 3/10      (2021.01)
  G03B 3/12      (2021.01)
  H02K 41/035      (2006.01)

(56)        References Cited

FOREIGN PATENT DOCUMENTS

| | | | | | |
|---|---|---|---|---|---|
| JP | 2009028641 | A | * | 2/2009 | ............ H02K 33/16 |
| JP | 2020-185503 | A | | 11/2020 | |
| JP | 2021-175244 | A | | 11/2021 | |
| KR | 20110075435 | A | * | 7/2011 | .............. G03B 7/04 |
| KR | 20190121098 | A | * | 10/2019 | ............ H02K 33/16 |

OTHER PUBLICATIONS

Machine translation of JP 2009028641 A retrieved electronically from PE2E Search Oct. 3, 2025 (Year: 2009).*
Machine translation of KR 20110075435 A retrieved electronically from PE2E Search Oct. 3, 2025 (Year: 2011).*
Machine translation of KR 20190121098 A retrieved electronically from PE2E Search Oct. 3, 2025 (Year: 2019).*
Sep. 30, 2025 Japanese Office Action, which is enclosed without an English Translation, that issued in Japanese Patent Application No. 2021-212512.

* cited by examiner

LINEAR MOTOR, LENS BARREL INCLUDING LINEAR MOTOR, AND DRIVE DEVICE INCLUDING LINEAR MOTOR

BACKGROUND OF THE INVENTION

Field of the Invention

The present invention relates to a linear motor, a lens barrel including the linear motor, and a drive device including the linear motor.

Description of the Related Art

A linear motor generates force mainly in one direction. Linear motors are practically used in various configurations from a minute device like an MEMS as a compact type to a drive mechanism of a linear motor car as a large-scale type, and are utilized in various industrial fields. Linear motors are used in applications that exclusively drive targets linearly in many cases, and are used together with linear guide mechanisms in many cases.

Linear motors are classified into an electromagnetic system, a pressure system, a friction system, a tension-extrusion system, etc. based on a thrust generation principle, and are classified into a finite track, an infinite track, etc., based on a drive range. Moreover, a device that converts a thrust of a regular rotary motor into a linear thrust by using a rack-and-pinion mechanism, a tire, etc. may also be classified into a linear motor (a linear actuator) in a broad sense.

A focusing mechanism in a lens barrel is an example of a use of a linear motor. In a lens barrel, a focusing operation that moves and adjusts a focus lens group therein forward and backward along an optical axis that intersects perpendicularly with an image sensor of a camera is performed in order to focus on an object at a desired position when an image is picked up. A linear motor is used for adjustment and movement of the focus lens group.

A linear motor used for a focusing mechanism in a lens barrel is required to satisfy the following conditions. The linear motor has a size that can be installed in the lens barrel, satisfies maximum output and resolution of thrust enough to move and adjust the focus lens group, and is quiet, etc. In order to satisfy these conditions, a linear motor of the electromagnetic system with the finite track, particularly, a linear motor that is generally called a voice coil motor (VCM) that generates Lorentz force with a combination of a permanent magnet and a coil, may be used from among the above-mentioned classifications.

Since a VCM does not generate thrust in not applying an electric current, when a VCM is used as a focusing mechanism in a lens barrel, it always needs to apply an electric current to the VCM to hold the focus lens group. Accordingly, an electric power consumption may become large in some image pickup scenes as compared with a case where another friction-type ultrasonic motor is used for the focusing mechanism in the lens barrel. This may cause quick consumption of a battery of the camera. Accordingly, when the VCM is used as the focusing mechanism in the lens barrel, improvement in power efficiency of the VCM is required.

In order to improve the power efficiency of the VCM with the finite track without enlarging an outside size, it is important to heighten efficiency of a magnetic circuit that consists of a permanent magnet and a yoke (hereinafter referred to as magnetic efficiency, simply). That is, it is important to heighten density of a magnetic flux that contributes to generation of the thrust in a coil area of the VCM. Although the magnetic circuit in the description compares the flow of the magnetic flux in a space to a flow of an electric current in a circuit and shows a direction and magnitude of the magnetic flux density in each point, it also shows the combination of the permanent magnet and yoke itself. Moreover, in a general VCM with the finite track, it is known that magnetic efficiency at both ends in a driving stroke is relatively lowered as compared with magnetic efficiency in a central part of the driving stroke. It also becomes practically important to reduce variation of magnetic efficiency (for example, see Japanese Laid-Open Patent Publication (Kokai) No. 2021-175244 (JP 2021-175244A), Priority of US 20210333504A1).

There is a known configuration that arranges magnets as an array applying the concept of the Hulbach array (for example, see Japanese Laid-Open Patent Publication (Kokai) No. 2020-185503 (JP 2020-185503A)) as a configuration example that improves the magnetic efficiency of the VCM with the finite track. This configuration is different from the case where the VCM is used as the focusing mechanism in the lens barrel in the stroke amount etc.

However, since the VCM of JP 2021-175244A deteriorates the magnetic efficiency in the central part of the driving stroke in order to equalize the magnetic efficiency in the driving stroke, power efficiency worsens as a whole. Moreover, since the configuration of JP 2020-185503A needs a fixing member to fix a magnet separately, there is a problem that the outside size of the linear motor tends to become large.

SUMMARY OF THE INVENTION

The present invention provides a linear motor that is capable of improving power efficiency while preventing enlargement of outside size, a lens barrel including the linear motor, and a drive device including the linear motor.

Accordingly, an aspect of the present invention provides a linear motor that generates thrust in a main axis direction, including a coil that is arranged so that a winding core direction of the coil approximately coincides with the main axis direction, a center yoke part that is arranged in an area inside the coil so as to extend in the main axis direction, a main magnet that is arranged at a position approximately facing the center yoke part in an area outside the coil so that a main magnetization direction of the main magnet intersects perpendicularly with the main axis direction, a back yoke part that is arranged so as to adjoin a magnetized surface of the main magnet that is opposite to a magnetized surface facing the center yoke in the main magnetization direction, two sub magnets that approximately adjoin the main magnet and that are arranged in postures where main magnetization directions are inclined with respect to the main magnetization direction of the main magnet, and two side yoke parts that arranged so as to approximately adjoin the center yoke part and the back yoke part at front and back positions of a magnet group including the main magnet and the two sub magnets in the main axis direction. At least parts of surfaces of the main magnet that approximately adjoin the two sub magnets incline inward of the main magnet at a side facing the back yoke part in the main magnetization direction of the main magnet. At least parts of surfaces of the two sub magnets that approximately adjoin the main magnet incline inward of the two sub magnets at a side facing the center yoke part in the main magnetization direction of the main magnet.

According to the present invention, the power efficiency is improved while preventing enlargement of the outside size.

Further features of the present invention will become apparent from the following description of exemplary embodiments with reference to the attached drawings.

BRIEF DESCRIPTION OF THE DRAWINGS

FIG. 3A, FIG. 3B, and FIG. 3C are front views showing the focusing mechanism in FIG. 2 viewed from an object side on an optical axis.

FIG. 5A, FIG. 5B, and FIG. 5C are schematic views showing linear motor according to a comparative example of the first embodiment.

DESCRIPTION OF THE EMBODIMENTS

Figure 1:
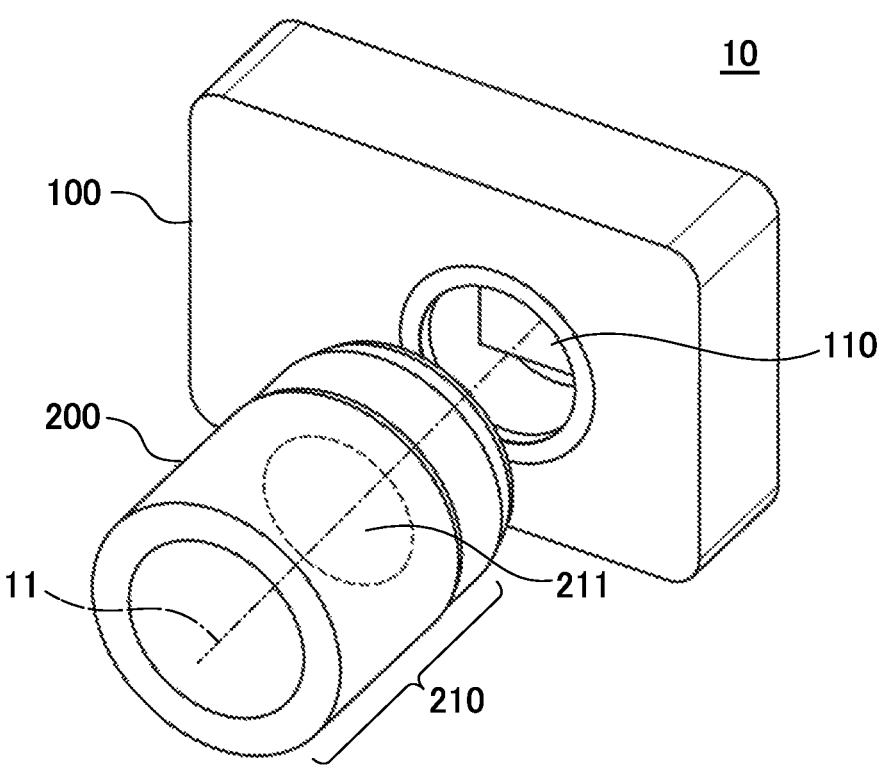
FIG. 1 is a schematic view showing a camera system that is a combination of a lens barrel according to a first embodiment and a camera to which the lens barrel is attached.

Hereafter, embodiments according to the present invention will be described in detail by referring to the drawings.

FIG. 1 is a schematic view showing a camera system 10 that is a combination of a lens barrel 200 according to a first embodiment and a camera 100 to which the lens barrel 200 is attached.

As shown in FIG. 1, the camera system 10 is provided with the camera 100 and the lens barrel 200. Moreover, FIG. 1 shows an optical axis 11 of the camera system 10, an image sensor 110 in the camera 100, a lens groups 210 (details are not shown) in the lens barrel 200, and a focus lens group 211 in the lens groups 210, respectively.

In the camera system 10, an image pickup surface of the image sensor 110 approximately intersects perpendicularly with the optical axis 11 of the camera system 10 at the center thereof. Moreover, when the lens barrel 200 is attached to the camera 100, the optical axis of the lens group 210 approximately coincides to the optical axis 11 of the camera system 10.

In this state, when the focus lens group 211 moves forward and backward in a direction parallel to the optical axis 11 (hereinafter referred to as an optical axis direction, simply), the focus of the lens group 210 to an object (not shown) approximately coincides to an image pickup surface of the image sensor 110. Thereby, an object image is imaged on the image pickup surface of the image sensor 110, and a clear image can be picked up. An operation to bring into focus by moving the focus lens group 211 in order to obtain such a clear image is generally called a focusing operation.

A camera system in recent years enables an autofocus (AF) operation that performs a focusing operation by electronic control in general in addition to a manual focusing operation that repeats visual confirmation and a manual operation by a user. The camera system 10 also has a focusing mechanism that is provided with a motor inside the lens barrel 200 to move the focus lens group 211 in the optical axis direction.

In order to enable a user to adjust a focus by the AF and to pick up an image comfortably, it is necessary to move the focus lens group 211 accurately and rapidly by the electronic control. This requires the motor to provide sufficiently high thrust and high resolution. Moreover, the motor of the focusing mechanism needs to be quiet in order to avoid influence on physical feeling of a user and to movie shooting. Furthermore, the motor of the focusing mechanism is preferably compact as much as possible in order not to enlarge the lens barrel 200 more than needed.

There is a method to save the weight and size of the focus lens group 211 as a driven object in order to improve the performance of the AF in addition to the above-mentioned method to improve the performance of the motor of the focusing mechanism. However, since the method of saving the weight and size adds restrictions to an optical design, the demand to the method of improving the performance of the motor is still high.

In this embodiment, the lens barrel 200 is provided with the focusing mechanism including a linear motor so as to respond to the above-mentioned demand. Hereinafter, the configuration of this focusing mechanism is described in detail.

Figure 2:
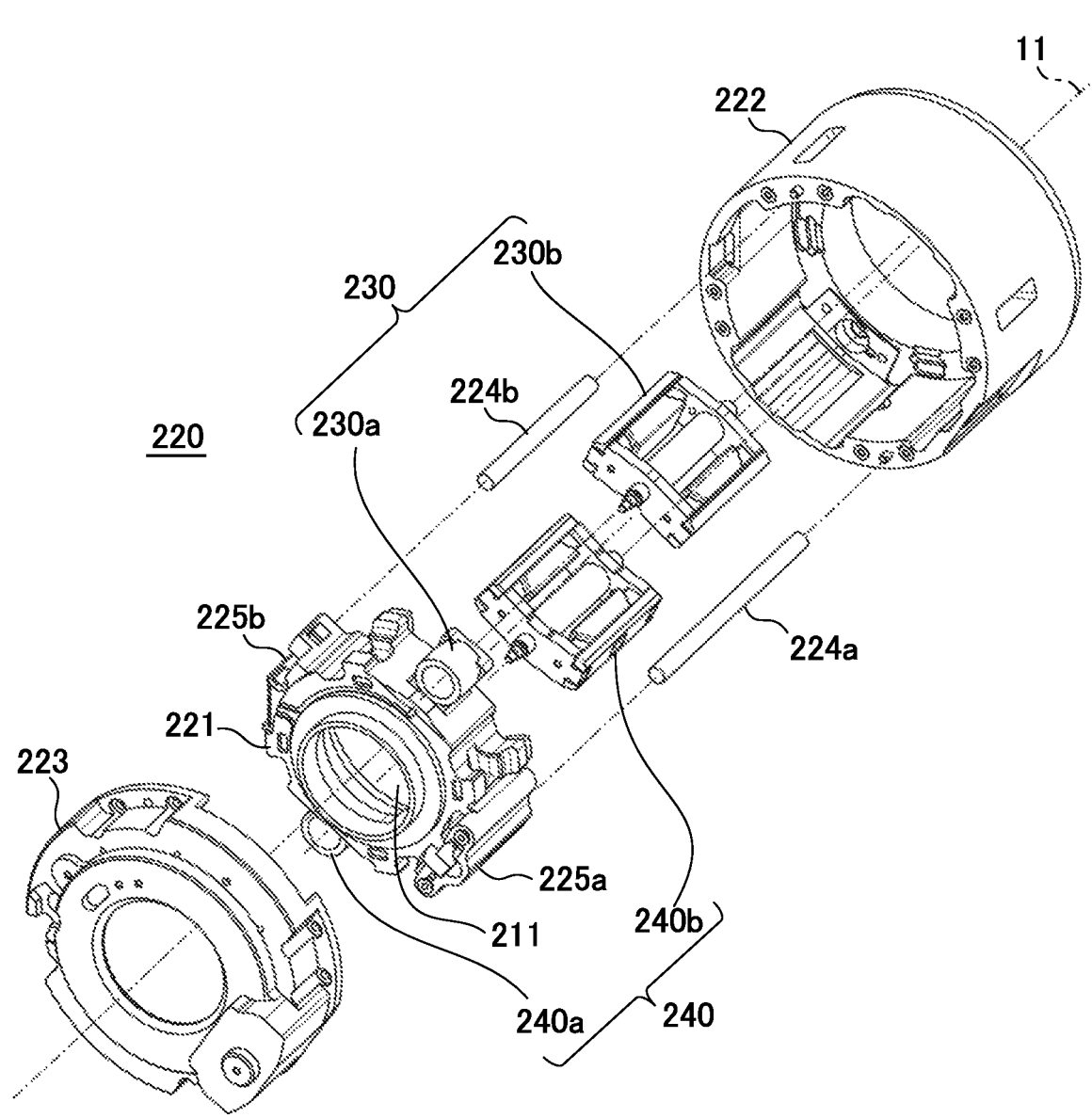
FIG. 2 is an exploded perspective view showing a focusing mechanism that is installed inside the lens barrel and is provided with a linear motor according to the first embodiment.

FIG. 2 is an exploded perspective view showing a focusing mechanism 220 that is installed inside the lens barrel 200 and is provided with linear motors 230 and 240 according to the first embodiment.

As shown in FIG. 2, the focusing mechanism 220 is provided with a lens holder 221, a fixed barrel 222, a lid 223, the linear motors 230 and 240, guide bars 224a and 224b, and guide component groups 225a and 225b.

The lens holder 221 is a movable body of the focusing mechanism and holds the focus lens group 211 so as to be movable in the optical axis direction.

The fixed barrel 222 and the lid 223 are components that constitute the lens barrel 200 itself and are fixed parts of the focusing mechanism.

The linear motors 230 and 240 are constituted by coil units 230a and 240a that are relative driven parts, and magnetic circuits 230b and 240b that are relative drive parts, respectively.

This embodiment exemplifies the configuration where the focus lens group 211, the focusing mechanism 220 that drives it, the two linear motors 230 and 240 provided in the focusing mechanism 220 are arranged inside the lens barrel 200. However, the linear motor of the present invention is applicable to a configuration including two or more focus lens groups (what is called a floating focus configuration) and to a configuration where one, three or more linear motors are provided for each focusing mechanism.

There are two reasons why the focusing mechanism 220 of this embodiment has the two linear motors 230 and 240. One reason is to obtain larger thrust by driving the linear motors 230 and 240 simultaneously. The other reason is to disperse application points of forces symmetrically with respect to a centroid of the lens holder 221 holding the focus lens group 211 so as to reduce occurrence of forces in unnecessary directions during movement of the lens holder 221 as the movable body in the optical axis direction.

The guide component groups 225a and 225b are respectively engaged with the guide bars 224a and 224b, and roll or slide on cylinder surfaces of the guide bars 224a and 224b in directions of cylinder axes. Each of the guide component groups 225a and 225b has bearing balls and an energizing member (details are not shown).

In the focusing mechanism 220 of this embodiment, the guide bars 224a and 224b are fixed to the fixed barrel 222 and the lid 223 so as to be approximately parallel to the optical axis 11 while keeping a distance therebetween. Moreover, the two guide component groups 225a and 225b are fixed to the lens holder 221 while engaging with the two guide bars 224a and 224b. Thereby, a linear guide mechanism that holds the lens holder 221 so as to be movable in one direction approximately parallel to the optical axis 11 is constituted. Since each guide engagement part is not a principal part of this embodiment, detailed illustration and description are omitted.

Each of the linear motors 230 and 240 is constituted by combining a coil unit, a magnet group (a permanent magnet group), and a yoke group. Namely, each of the linear motors 230 and 240 is what is called a voice coil motor (VCM) of the electromagnetic system with a finite track that generates Lorentz force with the combination of a permanent magnet and a coil, takes out it, and uses it.

In the linear motors 230 and 240, magnetic circuits 230b and 240b that are relative drive parts are constituted by combining magnet groups and yoke groups. And coil units 230a and 240a that are relative driven parts are arranged so as to enable relative movement with respect to the magnetic circuits. The linear motors 230 and 240 are fixed to the lens holder 221 as the movable body of the focusing mechanism 220 so that the relative moving directions, which are the directions generating thrust mainly, of the coil units 230a and 240a will coincide with the optical axis direction. Moreover, the magnetic circuits 230b and 240b are fixed to one or both of the fixed barrel 222 and the lid 223 that are the fixed parts of the focusing mechanism 220. Thereby, the focusing mechanism 220 is constituted so that the focus lens group 211 will be driven in the optical axis direction by the linear motors 230 and 240.

Although the focusing mechanism 220 employs the moving coil system in which the magnetic circuits 230b and 240b of the linear motors 230 and 240 are fixed and the coil units 230a and 240a are movable, the present invention is not limited to this. For example, the linear motors of the focusing mechanism 220 may employ a moving magnet system.

Moreover, the focusing mechanism 220 has other various components in order to achieve its function. For example, the focusing mechanism 220 is further provided with a position detection mechanism (not shown) and controls the focus lens group 211 to move to a target position by performing feedback control etc., while detecting the position of the lens holder 221 as the movable body. Moreover, the focusing mechanism 220 is further provided with coil power supply wirings (not shown) used for supplying electric power to the coil units 230a and 240a of the linear motors 230 and 240. Electric power is supplied to the coil units 230a and 240a through the coil power supply wirings during movement. Since these components are not principal parts of this embodiment, detailed illustration and description are omitted.

Figure 3A:
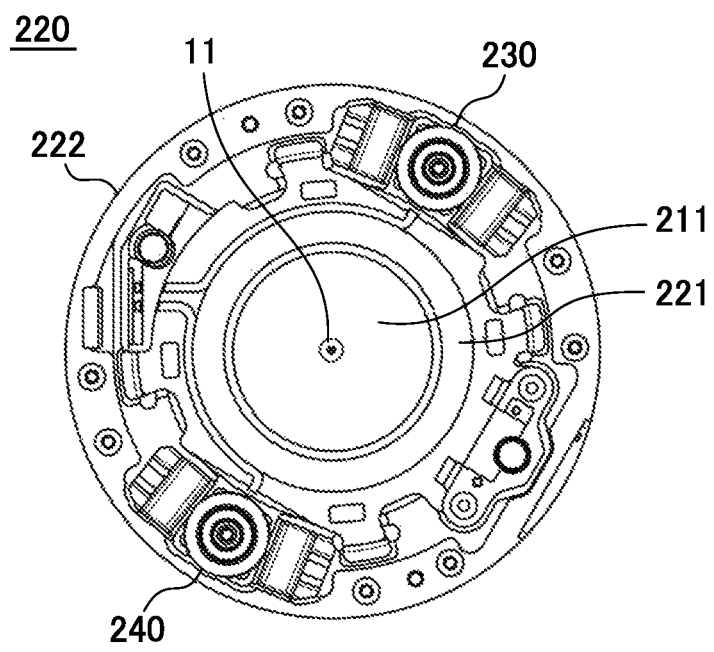

FIG. 3A, FIG. 3B, and FIG. 3C are front views showing the focusing mechanism 220 viewed from an object side on the optical axis 11.

As shown in FIG. 1 and FIG. 3A, the contour of the focusing mechanism 220 in the lens barrel 200 that generally takes a cylindrical shape takes a nearly circular shape. Furthermore, the focus lens group 211 and the lens holder 221 that are driven targets occupy the central area of the lens barrel 200.

Accordingly, the linear motors 230 and 240, the linear guide mechanism, the position detection mechanism (not shown), the coil power supply wiring (not shown), etc. constituting the focusing mechanism 220 are necessarily arranged in a limited area around the lens holder 221.

The linear motors 230 and 240 of this embodiment take shapes that are efficiently arranged in the above-mentioned limited area. Specifically, as shown in FIG. 3B, the linear motor 230 (240) takes a V-shape that follows the circular shape of the focusing mechanism 220 by inclining an angle between two magnets located across a main shaft to one side. This enables the linear motor 230 (240) to be efficiently fitted in the focusing mechanism 220 without dropping efficiency due to miniaturization more than needed.

In the meantime, the shape of the linear motor 230 (240) shown in FIG. 3B is not a principal part of this embodiment. As shown in FIG. 3C, the two magnets located across the central main shaft may face at an angle of about 180 degrees by taking a horizontally opposed form. In the following description, the case where the linear motors 230 and 240 have the horizontally opposed form shown in FIG. 3C will be illustrated and described in detail in considering convenience of illustration.

Each of the linear motors 230 and 240 improves magnetic efficiency because of having the configuration of the magnetic circuit that consists of the combination of the magnet group and yoke group. The details of the configuration will be described hereinafter. In the following description, the linear motor 230 at one side will be illustrated and described as a representative of this embodiment. The linear motor 240 at the other side shall have the same configuration.

Figures 4A, 4B, 4C:
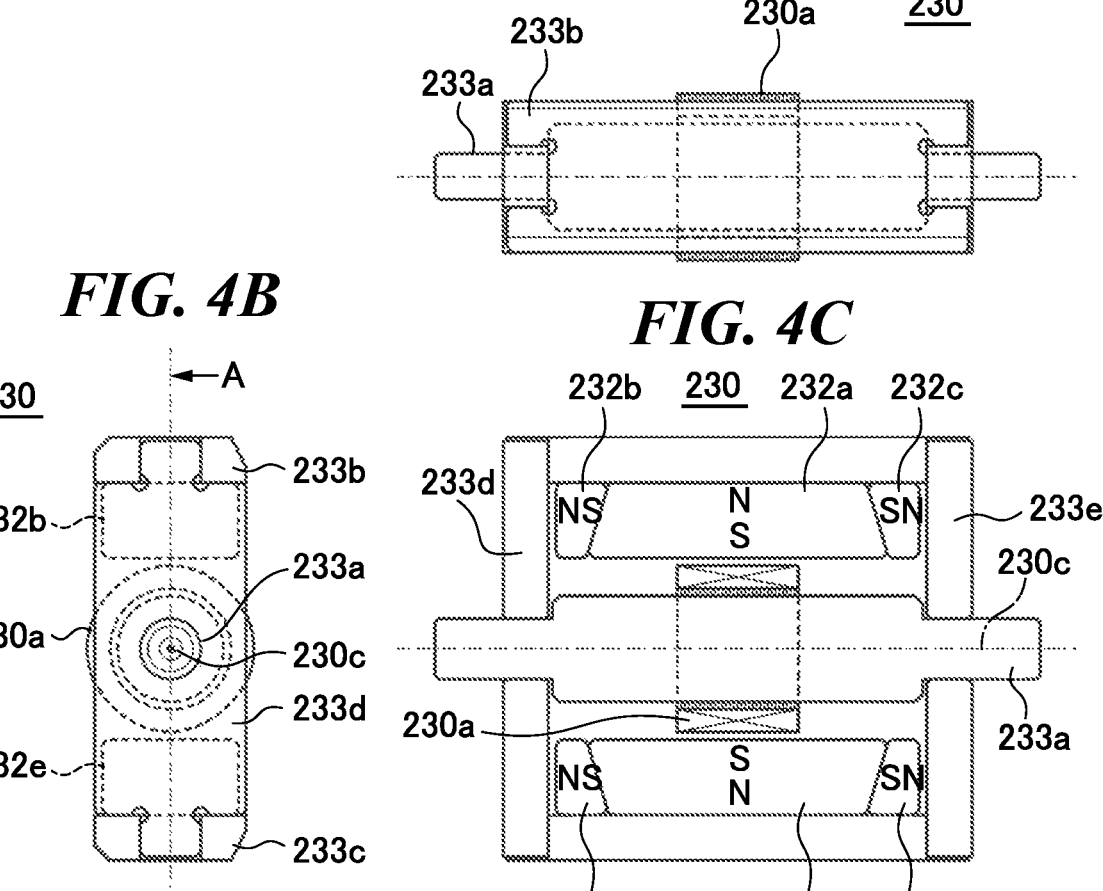
FIG. 4A, FIG. 4B, and FIG. 4C are schematic views showing the linear motor according to the first embodiment.

FIG. 4A, FIG. 4B, and FIG. 4C are schematic views showing the linear motor 230 according to this embodiment.

FIG. 4C is a sectional side view showing the linear motor 230 viewed from the outside of the focusing mechanism 220 in a radial direction. Moreover, FIG. 4A is a top view showing the linear motor 230 shown in FIG. 4C viewed from the upside by the third angle projection. FIG. 4B is a front view showing the linear motor 230 shown in FIG. 4C viewed from the left side by the third angle projection.

Figures 5A, 5B, 5C:
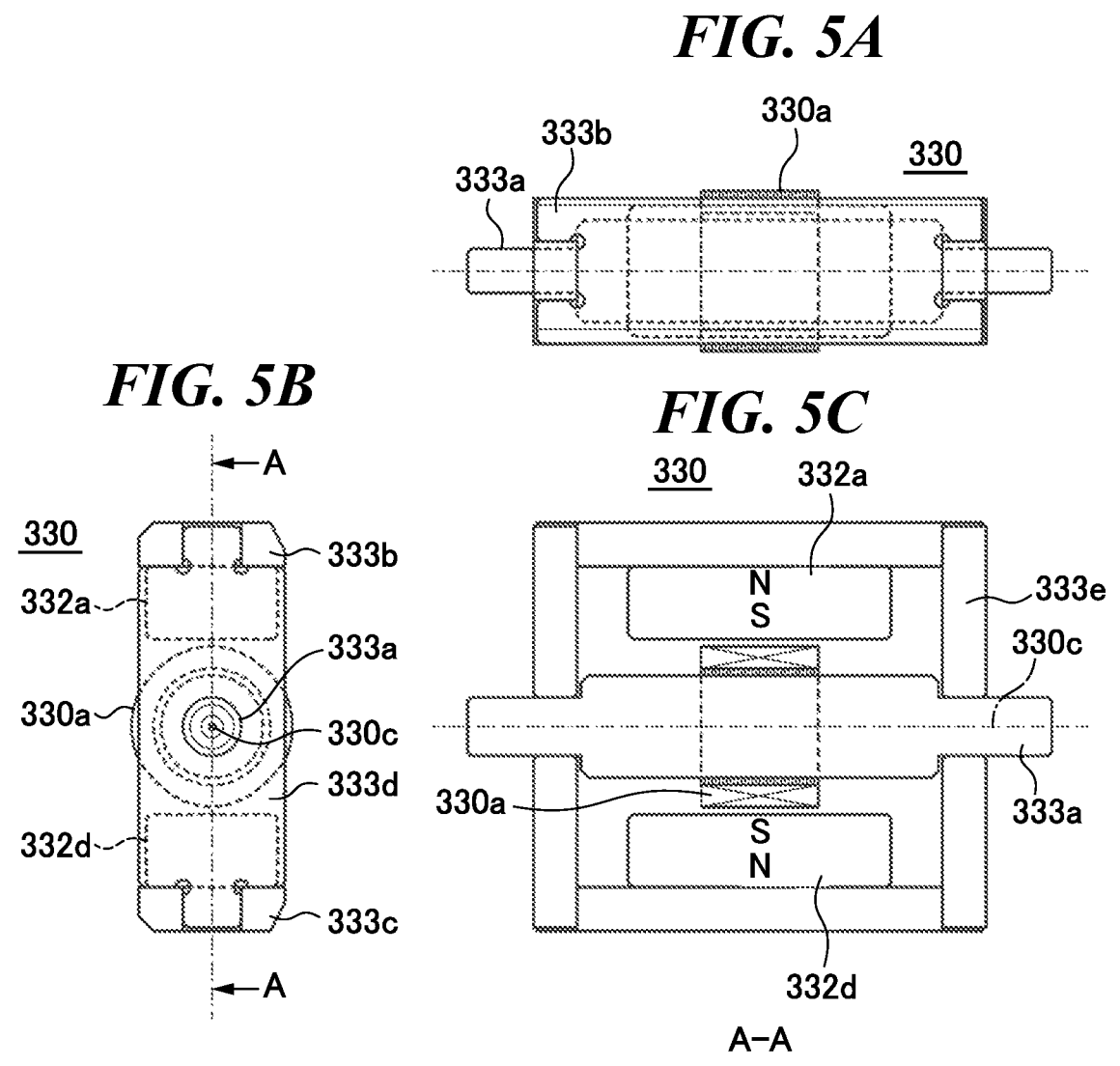

Moreover, FIG. 5A, FIG. 5B, and FIG. 5C are schematic views (a three-plane drawing similar to FIG. 4A, FIG. 4B, and FIG. 4C) showing a linear motor 330 that is a comparative example of the linear motor 230 of the first embodiment.

The linear motor 330 of the comparative example is assumed to have a configuration similar to the linear motor 230 of this embodiment, to have a size compatibility, and to be applicable to the focusing mechanism 220 of this embodiment. In order to suit convenience of the description, last 2 digits of a reference numeral applied to a component of the linear motor 330 of the comparative example are identical to that applied to a corresponding component of the linear motor 230 of this embodiment.

The configuration of the linear motor 330 of the comparative example will be described first by referring to FIG. 5A, FIG. 5B, and FIG. 5C. Unless otherwise specifically noted, the following description corresponds also about the configuration of the linear motor 230 of this embodiment.

As shown in FIG. 5A, FIG. 5B, and FIG. 5C, the linear motor 330 of the comparative example is provided with a coil unit 330a, main magnets 332a and 332d, a center yoke 333a, back yokes 333b and 333c, and side yokes 333d and 333e.

The coil unit 330a is a relative driven part of the linear motor 330. Components of the linear motor 330 except the coil unit 330a constitute a relative drive part that forms a magnetic circuit consisting of a magnet group and a yoke group.

The main magnets 332a and 332d constitute the magnet group in the magnetic circuit. Each of the main magnets 332a and 332d is magnetized and is polarized in an N pole and an S pole. In FIG. 5C, symbols S and N are written about the main polarizations. A direction toward the N pole from the S pole is defined as a main magnetization direction of each magnet.

The center yoke 333a, the back yokes 333b and 333c, and the side yokes 333d and 333e constitute the yoke group in the magnetic circuit. Each yoke is made from soft magnetism material etc. Moreover, a main axis direction 330c shows the direction of the main shaft of the linear motor 330. The center yoke 333a is equivalent to a center yoke part of the yoke group of the linear motor 330. Furthermore, the back yokes 333b and 333c are equivalent to back yoke parts of the yoke group of the linear motor 330 respectively corresponding to the main magnets 332a and 332d. Moreover, the side yokes 333d and 333e are equivalent to side yoke parts of the yoke group of the linear motor 330.

The linear motor 330 generates main thrust in the main axis direction 330c. The coil unit 330a is arranged so as to be relatively movable in the direction 330c with respect to the magnetic circuit consisting of the magnet group and yoke group in a posture where a winding core direction approximately coincides to this direction 330c.

The center yoke 333a plays a role of the main shaft of the linear motor 330 and is arranged in an area inside the coil unit 330a so as to extend in the main axis direction 330c. There is clearance between the coil unit 330a and the center yoke 333a, and they are relatively movable without contacting mutually. In the linear motor 330, the magnetic circuit is constituted by assembling the other yoke parts of the yoke group and the parts of the magnet group to the center yoke 333a. Accordingly, the magnetic circuit in the focusing mechanism 220 is fixed in a posture where the axis direction of the center yoke 333a approximately coincides to the optical axis direction.

The main magnets 332a and 332d are arranged in areas outside the coil unit 330a in states where the main magnetization directions intersect perpendicularly with the main axis direction 330c and are directed to directions approximately facing the center yoke 333a. A pole of a magnetized surface facing the center yoke 333a may be either of the N pole and the S pole. In the meantime, it is necessary to match the poles of the pole surfaces of the magnets 332a and 332d. These magnets mainly play a role of forming magnetic fields in directions that contribute generation of Lorentz force.

The back yokes 333b and 333c are arranged approximately adjacently to magnetized surfaces of the main magnets 332a and 332d that are opposite to the magnetized surfaces facing the center yoke 333a in the main magnetization direction. The back yokes 333b and 333c play roles of improving magnetic flux density in a direction of the coil and improving magnetic efficiency by reducing magnetic flux leakage at the sides opposite to the coil unit 330a.

The back yokes 333b and 333c are longer than the main magnets 332a and 332d in the length in the main axis direction 330c. Furthermore, concavo-convex splice forms that engage to the side yokes 333d and 333e mentioned later are provided at the both ends of the back yokes 333b and 333c in the main axis direction 330c.

The side yokes 333d and 333e have fitting holes corresponding to shafts of attachment parts at the both ends of the center yoke 333a, and are attached from the both sides in the main axis direction 330c to the center yoke 333a so that the shafts are inserted into the fitting holes, respectively. Then, the side yokes 333d and 333e are engaged to the back yokes 333b and 333c by the concavo-convex splice forms at four positions. In this state, the back yokes 333b and 333c and the side yokes 333d and 333e receive forces going toward the center yoke 333a by the magnetic forces of the main magnets 332a and 332d. Accordingly, since the engagement parts gears strongly and the shape is stabilized, the magnetic circuit section of the linear motor 330 can be constituted without fixing by screws separately.

Next, a generation principle of thrust in the linear motor 330 will be described by referring to FIG. 6.

Figure 6:
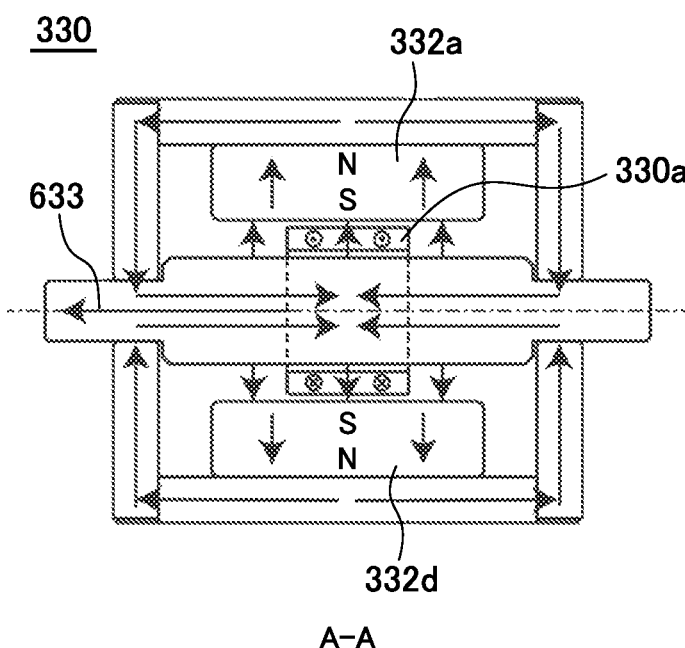
FIG. 6 is an explanatory view showing a generation principle of thrust in the linear motor.

FIG. 6 is a sectional side view showing the linear motor 330, its magnetic fields, and a direction of the Lorentz force.

When an electric current flows in the coil unit 330a in its circumferential direction in the magnetic fields going toward (or going away from) the center yoke 333a from the main magnets 332a and 332d shown by arrows (reference numerals are omitted) in FIG. 6, the Lorentz force in a direction shown by an arrow 633 occurs. This becomes the thrust. The thrust in this state is proportional to the electric current that flows in the coil unit 330a. Moreover, its proportionality constant is a thrust constant proportional to the strength of the magnetic field in the area through which the electric current flows. Accordingly, in order to improve the power efficiency of the linear motor 330, it is necessary to strengthen the magnetic field (i.e., effective magnetic field intensity) in the coil unit 330a shown in FIG. 6. This is equivalent to improvement of the magnetic efficiency.

As compared to the above-mentioned linear motor 330 of the comparative example, the linear motor 230 of this embodiment has a magnet group that consists of sub magnets 232b, 232c, 232e, and 232f that are adjacently added to both sides of the main magnets 232a and 232d in the main axis direction 230c. Furthermore, main magnetization directions of the sub magnets 232b, 232c, 232e, and 232f approximately correspond to the main axis direction 230*c*. Specifically, the magnetic poles of the surfaces that adjoin the main magnets 232*a* and 232*d* coincide to the magnetic poles of the surfaces of the main magnets facing the center yoke 233*a*. Furthermore, the sectional shape of the main magnet 232*a* of this embodiment is a trapezoid of which the side of the center yoke 233*a* is long and the side of the back yoke 233*b* side is short as shown in FIG. 4C. The surfaces of the sub magnets 232*b* and 232*c* adjacent to the main magnet 232*a* incline inward of the main magnet 232*a* with respect to the main magnetization direction toward the back yoke 233*b* so as to contact the main magnet 232*a*. The relation between the main magnet 232*d* and the sub magnets 232*e* and 232*f* is also similar. Subsequently, these effects are described.

The sub magnets 232*b*, 232*c*, 232*e*, and 232*f* in the linear motor 230 of this embodiment respectively adjoin the main magnets 232*a* and 232*d* and partially reproduce the Hulbach array that arranges permanent magnets by changing orientation of the N pole and the S pole by 90 degrees. That is, the characteristic feature of the linear motor 230 of this embodiment is that the magnet array is the array (hereinafter referred to as an applied Hulbach array) to which the concept of the Hulbach array is applied.

It is known that the magnetic field in the magnet array surface (a front surface opposite to a back surface at the side of the back yoke) of the Hulbach array becomes stronger than that of other magnet arrays. This is simply understood as follows. Since a sub magnet improves reflux of a magnetic flux of a main magnet from a front surface to a back surface, magnetic flux leakage to circumference is reduced and that magnetic flux appears as an additional flux in the front surface. A more detailed description about the principle is omitted. Since the effective magnetic field intensity of the linear motor 230 of this embodiment that employs the applied Hulbach array to which the concept of the Hulbach array is applied becomes stronger than the effective magnetic field intensity of the linear motor 330 of the comparative example shown in FIG. 6, the thrust constant of the linear motor 230 becomes larger than that of the linear motor 330.

Figure 7:
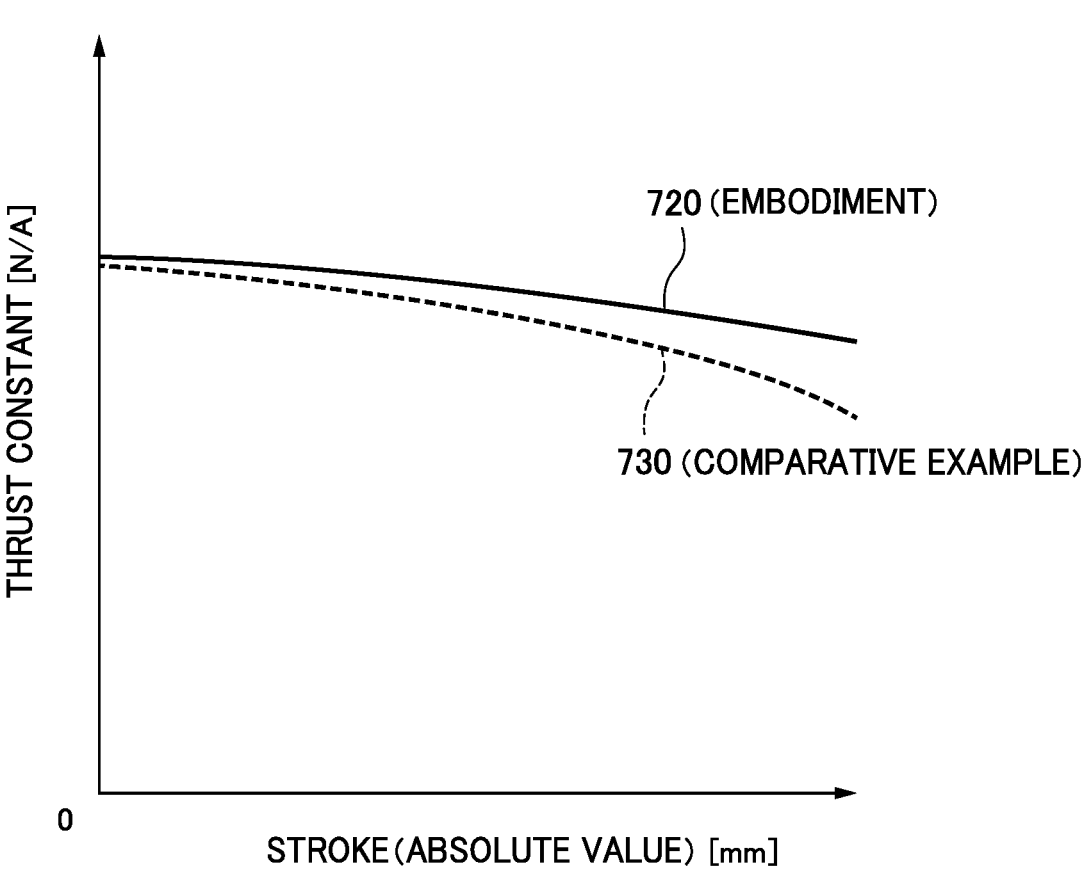
FIG. 7 is a graph showing a thrust characteristic of the linear motor of the comparative example and a thrust characteristic of the linear motor of the first embodiment.

FIG. 7 is a graph showing a thrust characteristic 730 of the linear motor 330 of the comparative example and a thrust characteristic 720 of the linear motor 230 of this embodiment. A vertical axis indicates the thrust constant and a horizontal axis indicates an absolute value of a plus/minus stroke amount in a case where a stroke center of each of the linear motors 230 and 330 is set to 0. Generally, since magnetic efficiency in stroke end parts of a VCM with a finite track falls compared with that in a stroke central part, the thrust constant in the stroke end part is lowered as shown by the thrust characteristic 730 of the linear motor 330 of the comparative example. The thrust characteristic 720 of the linear motor 230 of this embodiment shows that the thrust constant in the stroke end parts increases relatively as compared with that of the linear motor 330. This improves the power efficiency.

Since such improvement of the power efficiency in the stroke end parts raises the minimum performance of the linear motor, it is useful from a viewpoint of practicality. Particularly, when the linear motor 230 is used for the focusing mechanism of the camera system 10 like this embodiment, the stroke end parts are areas used by image pickup of an object at a distance equivalent to infinity and image pickup of an object at close range. Accordingly, the improvement of the power efficiency in the stroke end parts improves the power efficiency in these image pickup scenes greatly. For example, the former image pickup scene is a scene where a user holds the camera system in an aspiration (facing up) posture for a long time in picking up a starry sky image etc. Moreover, the latter image pickup scene is a scene where a user holds the camera system in an overlooking (facing down) posture for a long time in picking up a commodity image etc. The power efficiency of the linear motor 230 in these image pickup scenes becomes higher than before. That is, the electric power consumption of the camera system 10 becomes lower than before. Accordingly, a user can concentrate attention on an image pickup operation without worrying about a battery residual amount or a heat generation.

Figure 8A:
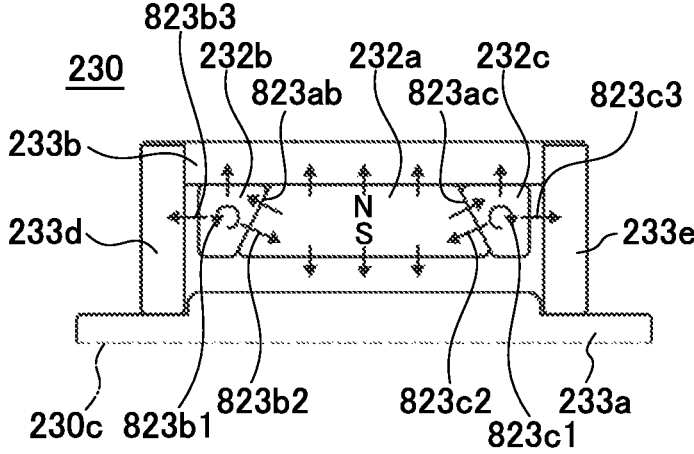
FIG. 8A, FIG. 8B, and FIG. 8C are explanatory views showing forces acting on each magnet in the linear motor according to the first embodiment.
Figure 8B:
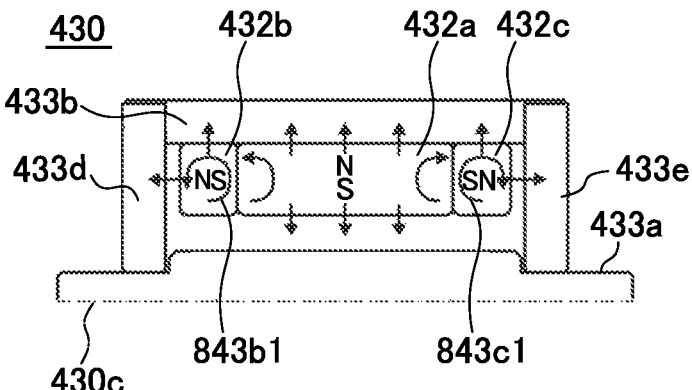
Figure 8C:
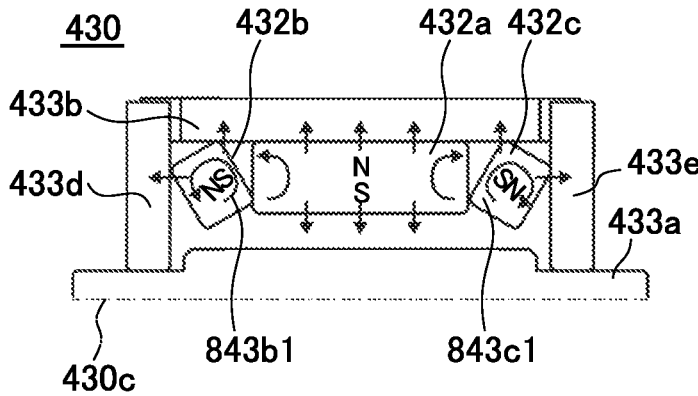

FIG. 8A, FIG. 8B, and FIG. 8C are schematic views describing main forces acting on each magnet array in the linear motor 230 according to this embodiment and each magnet array in a linear motor 430 of a comparative example.

FIG. 8A is a view showing the linear motor 230 of this embodiment, and FIG. 8B is a view showing the linear motor 430 of the comparative example. Moreover, FIG. 8C is a view showing a state where the linear motor 430 results immediately after the state of FIG. 8B. Moreover, in FIG. 8A through FIG. 8C, only forces in connection with principal parts among forces acting on each magnet are shown by arrows.

Unlike the shapes of the main magnet 232*a* and the sub magnets 232*b* and 232*c* of this embodiment shown in FIG. 8A, shapes of a main magnet 432*a* and sub magnets 432*b* and 432*c* of the comparative example shown in FIG. 8B have rectangular parallelepiped shapes without having inclined adjacent surfaces.

In addition, the linear motor 430 of the comparative example is assumed to have a configuration similar to the linear motor 230 of this embodiment and to have a size compatibility. Last 2 digits of a reference numeral applied to a component of the linear motor 430 are identical to that applied to a corresponding component of the linear motor 230. Moreover, since both the linear motor 230 of this embodiment and the linear motor 430 of the comparative example have plane symmetrical structures to medium planes including main axis directions (230*c*, 430*c*), only upper halves in the side views are shown by simplifying the illustrations. It should be noted that only upper halves of symmetrical structures are shown similarly in the following views.

In the applied Hulbach array, as shown in FIG. 8B, resultant forces (hereinafter referred to as rotational forces, simply) 843*b*1 and 843*c*1 in rotating directions are applied to the sub magnets 432*b* and 432*c*. These forces are received from the main magnet 432*a*. That is, since the same pole surfaces of the magnets repel each other and the different pole surfaces attract each other, such rotational forces are applied. Accordingly, unless the sub magnets 432*b* and 432*c* are fixed by pressing force or adhesion, the magnet array show in FIG. 8B is immediately changed to the state in FIG. 8C because the sub magnets 432*b* and 432*c* rotate while extending the side yokes 433*d* and 433*e*. As a result, finally the sub magnets 432*b* and 432*c* adjoin the main magnet 432*a* so that the different pole surfaces face mutually. That is, when the sub magnets 432*b* and 432*c* are not fixed, the applied Hulbach array collapses immediately, and also the structure of the magnetic circuit is broken because the side yokes 433*d* and 433*e* are extended. In order to prevent the rotations while employing the magnet array shown in FIG. 8B, it is necessary to have a fixing means for the magnets separately, which enlarges the magnetic circuit, enlarging the linear motor.

Against this, in this embodiment, since the magnets of the applied Hulbach array have the shapes shown in FIG. 8A, the rotational force 823*b*1 and 823*c*1 to the sub magnets 232*b* and 232*c* are reduced compared with the rotational force 843*b*1 and 843*c*1 in FIG. 8B. Furthermore, attractions 823*b*2 and 823*c*2 occur between adjacent surfaces of the main magnet 232*a* and the sub magnets 232*b* and 232*c*. This is because adjacent surfaces 823*ab* and 823*ac* equivalent to side surfaces of the main magnet 232*a* in the main magnetization direction become slight magnetized surfaces (the N pole in FIG. 8A) by inclining these surfaces inward with respect to the main magnetization direction toward the back yoke 233*b*.

As an actual example of making a magnet, when magnetic material of the shape of the main magnet 232*a* is made before magnetization and is magnetized with respect to the main magnetization direction, the adjacent surfaces 823*ab* and 823*ac* become the slight magnetized surfaces. Since the magnetic pole of these surfaces of the main magnet 232*a* of these surfaces is different from the magnetic pole of the facing surfaces of the sub magnets 232*b* and 232*c*, attraction forces occur between the main magnet 232*a* and the sub magnets 232*b* and 232*c*. The sub magnets 232*b* and 232*c* are also similar. As more intuitive description, it can be considered that a part of the attraction force of the main magnet 232*a* to the back yoke 233*b* is converted into the attraction force to the sub magnets 232*b* and 232*c*. Furthermore, it can be said that a part of forces that give the rotational forces to the sub magnets 432*b* and 432*c* of the comparative example are converted into the attraction force to the sub magnets 232*b* and 232*c* of this embodiment. Accordingly, the rotational forces acting on the sub magnets 232*b* and 232*c* become weaker than the rotational forces 843*b*1 and 843*c*1 (FIG. 8B) of the comparative example. In this state, although the rotational forces 823*b*1 and 823*c*1 remain in the sub magnets 232*b* and 232*c*, they are attracted by the main magnet 232*a*, and the main magnet 232*a* having a wedge shape functions as a pressure foot. Accordingly, the sub magnets 232*b* and 232*c* are stable and do not rotate even when they are not fixed separately.

The sub magnets 232*b* and 232*c* receive forces shown by arrows 823*b*3 and 823*c*3 in directions going away from the main magnet 232*a*. These forces are received from the side yokes 233*d* and 233*e* as reactions of attraction forces of the sub magnets 232*b* and 232*c* to the side yokes. Although these forces act in the directions in which the sub magnets 232*b* and 232*c* are separated from the main magnet 232*a*, the sub magnets 232*b* and 232*c* receive attraction forces shown by arrows 823*b*2 and 823*c*2 from the main magnet 232*a*. The attraction forces shown by the arrows 823*b*2 and 823*c*2 are set so as to become stronger than the forces shown by the arrows 823*b*3 and 823*c*3. Accordingly, the sub magnets 232*b* and 232*c* do not separate from the main magnet 232*a*. In addition, such a setting is achieved by providing certain clearances between the sub magnets 232*b* and 232*c* and the side yokes 233*d* and 233*e*.

Moreover, the main magnet 232*a* also receives forces that are attracted by the side yokes 233*d* and 233*e* of both sides through the sub magnets 232*b* and 232*c*. However, the main magnet 232*a* strongly sticks to the back yoke 233*b* facing in the main magnetization direction and is held by strong static friction force. Accordingly, the main magnet 232*a* does not move to one of the side yokes 233*d* and 233*e* easily with one of the sub magnets 232*b* and 232*c*. It is more preferable to provide an auxiliary fixing means that holds the magnet group (the main magnet 232*a* and sub magnets 232*b* and 232*c*) on the back yoke 233*b*.

Moreover, since the side yokes 233*d* and 233*e* are attracted by the sub magnets 232*b* and 232*c*, the structure of the magnetic circuit by the above-mentioned spline forms are stabilized more. That is, since the structure of this embodiment does not lose the stability of the magnetic circuit, this embodiment is achievable by exchanging the magnet group without accompanying big change to the magnetic circuit structure of the comparative example shown in FIG. 5B.

As mentioned above, the linear motor 230 of this embodiment improves the magnetic efficiency and the power efficiency by employing the applied Hulbach array as the array of magnets. Furthermore, the shape of each magnet that constitutes the linear motor 230 of this embodiment is not a general rectangular parallelepiped shape but is a shape having an inclined surface. Thereby, addition of a fixing means that cancels repulsion of the magnets in the applied Hulbach array becomes unnecessary. Accordingly, the linear motor 230 improves the power efficiency without changing the outside size as compared with the linear motor 330 of the comparative example. Accordingly, this embodiment provides the linear motor 230 that has the power efficiency higher than before while keeping the size suitable for the focusing mechanism of the lens barrel 200.

Next, a second embodiment will be described. In this embodiment, the same reference numeral is applied to the same configuration as that of the linear motor 230 of the first embodiment. Moreover, only one side of a plane symmetrical structure of a linear motor of this embodiment will be illustrated and described as with FIG. 8A showing the linear motor 230 of the first embodiment.

Figure 9:
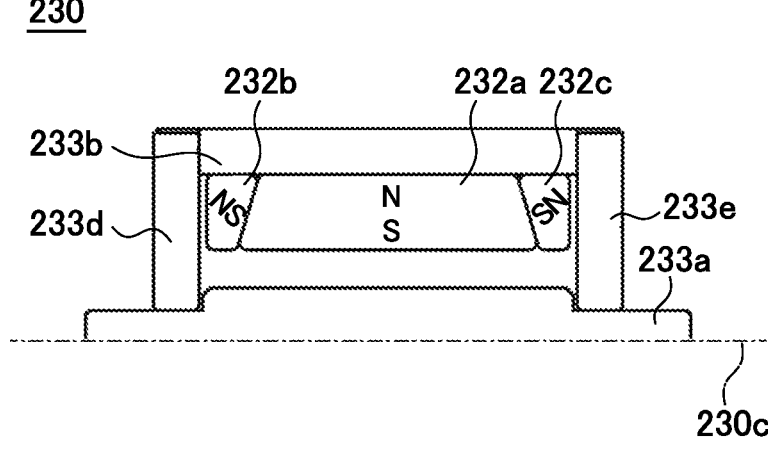
FIG. 9 is a schematic view showing a first example of a magnet array in a linear motor according to a second embodiment.

FIG. 9 is a schematic view showing a first example of a magnet array in the linear motor 230 according to this embodiment. In the first embodiment, the main magnetization directions of the sub magnets 232*b* and 232*c* incline by an inclination angle of about 90 degrees with respect to the main magnetization direction of the main magnet 232*a* from the side facing the back yoke 233*b* to the main axis direction 230*c*. In the meantime, the inclination angle of the main magnetization directions of the sub magnets 232*b* and 232*c* with respect to the main magnetization direction of the main magnet 232*a* is not limited to 90 degrees as long as it is more than 0 degrees and is equal to or less than 90 degrees. Accordingly, the inclination angle of the main magnetization directions of the sub magnets 232*b* and 232*c* with respect to the main magnetization direction of the main magnet 232*a* in this embodiment is set within the range of more than 0 degrees and less than 90 degrees as shown in FIG. 9 (0°<angle≤90°).

In this way, when the inclination angle of the main magnetization directions of the sub magnets 232*b* and 232*c* with respect to the main magnetization direction of the main magnet 232*a* is changed, a part of the above-mentioned role of the sub magnets 232*b* and 232*c* (the role to improve reflux of a magnetic flux of the main magnet 232*a* in the magnetic circuit) is converted into a role to contribute to generation of the Lorentz force. Even in this case, the magnet array is regarded as the applied Hulbach array, and the merit of the improvement in the power efficiency is obtained. By adjusting balance therebetween, the optimal magnet array in each linear motor can be designed.

Figure 10:
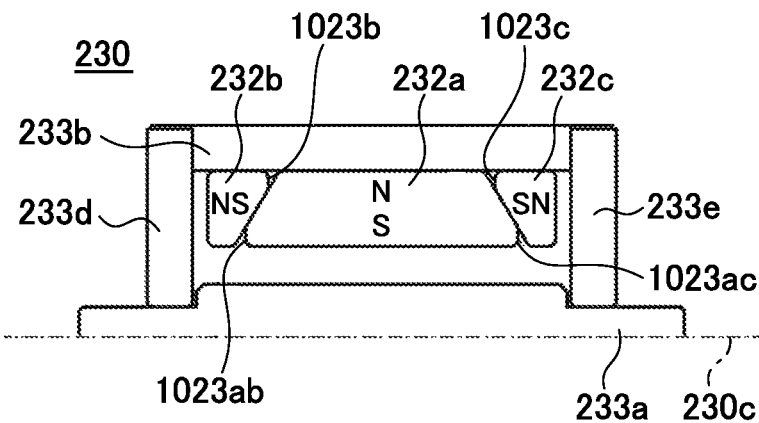
FIG. 10 is a schematic view showing a second example of the magnet array in the linear motor according to the second embodiment.

FIG. 10 is a schematic view showing a second example of a magnet array in the linear motor 230 according to this embodiment. In the first embodiment, the mutually adjacent surfaces of the main magnet 232*a* and the sub magnets 232*b* and 232*c* are wholly inclined inward of the magnets. In the meantime, the mutually adjacent surfaces may be partially inclined as shown in FIG. 10. That is, as shown in the configuration in FIG. 10, the main magnet 232a may have non-inclined surfaces 1023ab and 1023ac and the sub magnets 232b and 232c may have non-inclined surfaces 1023b and 1023c. In addition, although all the main magnet 232a and the sub magnets 232b and 232c have the non-inclined surfaces in the example in FIG. 10, only the main magnet 232a may have the non-inclined surfaces or only the sub magnets 232b and 232c may have the non-inclined surfaces.

When such a configuration is employed, the increment of the efficiency slightly decreases due to decrement of the magnet volume. In the meantime, since acute angle edges of the magnets are reduced, breakage of the magnets is prevented and demagnetization resistance performance is improved. Furthermore, since an indefinite magnetization part is eliminated, individual variation in mass production can be reduced. Such practical merits can be obtained.

Figure 11:
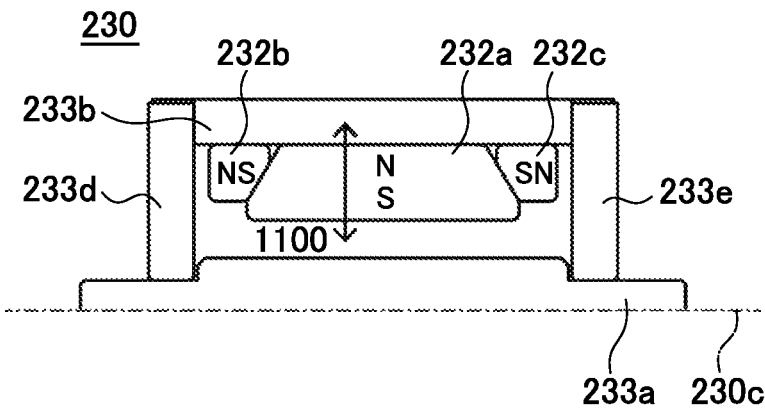
FIG. 11 is a schematic view showing a third example of the magnet array in the linear motor according to the second embodiment.

FIG. 11 is a schematic view showing a third example of a magnet array in the linear motor 230 according to this embodiment.

As shown in FIG. 11, the height of the sub magnets 232b and 232c in a height direction (a direction of a two-way arrow 1100) that is parallel to the main magnetization direction of the main magnet 232a is lower than the height of the main magnet 232a.

When such a configuration is employed, an approaching distance between the magnetized surfaces of the same pole (the S pole in this embodiment) at the end parts becomes longer between the main magnet 232a and the sub magnets 232b and 232c. Accordingly, the rotational forces equivalent to the repulsion forces between the main magnet 232a and the sub magnets 232b and 232c are reduced more, and the magnets are stabilized more. Moreover, since strength of demagnetizing fields that occur between the adjacent magnets can be reduced, the demagnetization resistance performance is improved more.

Figure 12A:
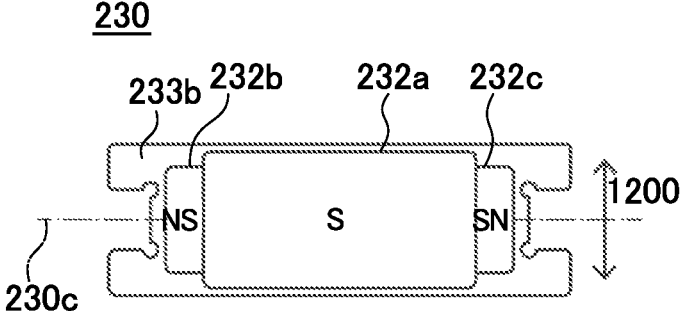
FIG. 12A and FIG. 12B are schematic views showing a fourth example of the magnet array in the linear motor according to the second embodiment.
Figure 12B:
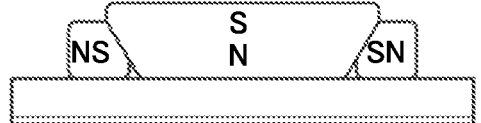

FIG. 12A and FIG. 12B are schematic views showing a magnet array of a fourth example in the linear motor 230 according to this embodiment. FIG. 12A is a top view and FIG. 12B is a front view. FIG. 12A is the schematic view showing a combination of the magnet group and back yoke 233b extracted from the linear motor 230. In FIG. 12A, the main magnet 232a is viewed from the center yoke 233a. As shown in FIG. 12A, a width of the sub magnets 232b and 232c is smaller than a width of the main magnet 232a in a width direction (a direction of a two-way arrow 1200) that intersects perpendicularly with both the main axis direction 230c and main magnetization direction of the main magnet 232a.

When such a configuration is employed, since the sub magnets 232b and 232c receive attraction forces in a convergence direction held in the center in the width direction from the main magnet 232a, the magnets are stabilized more.

In addition, as mentioned above, since the magnets in the magnet group of the linear motor 230 of this embodiment are mutually attracted and are stabilized even in the applied Hulbach array, the fixing means for the magnet group can be omitted. In the meantime, the magnet group may be fixed by the fixing means provided separately in order to improve the practical intensity of the linear motor 230 of the embodiment more, for example, in order to keep the magnet group from shifting due to impact etc.

Figure 13A:
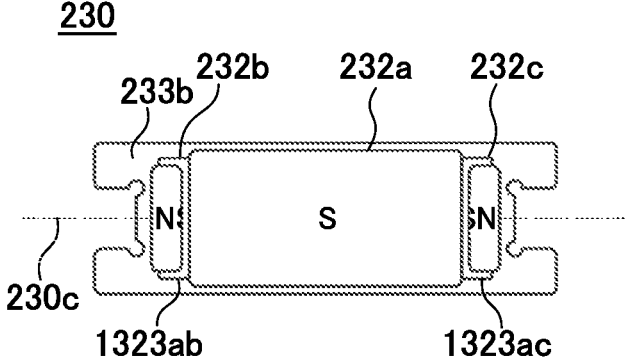
FIG. 13A and FIG. 13B are explanatory views showing a fixing method of a magnet group in the linear motor according to the second embodiment.
Figure 13B:
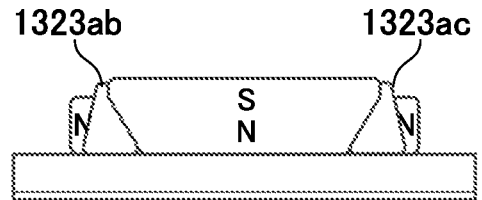

FIG. 13A and FIG. 13B are schematic views showing a fixing method of the magnet group in the linear motor 230 of this embodiment. FIG. 13A is a top view and FIG. 13B is a front view. As the fixing method of the magnet group, there is an adhesion method that mutually fixes the main magnet 232a, the sub magnets 232b, 232c, and the back yoke 233b by applying adhesive to areas 1323ab and 1323ac shown in FIG. 13A, for example. In such a case, when at least one of the height and width of the sub magnets 232b and 232 is lower (smaller) than that of the main magnet 323a as shown in FIG. 11, FIG. 12A, and FIG. 12B, the adhesive is preferably applied to spaces that become free as a result. Thereby, they are adhered without projecting from the contour of the linear motor 230. Accordingly, the magnet group is fixed without enlarging the outside size of the linear motor 230.

Figure 14A:
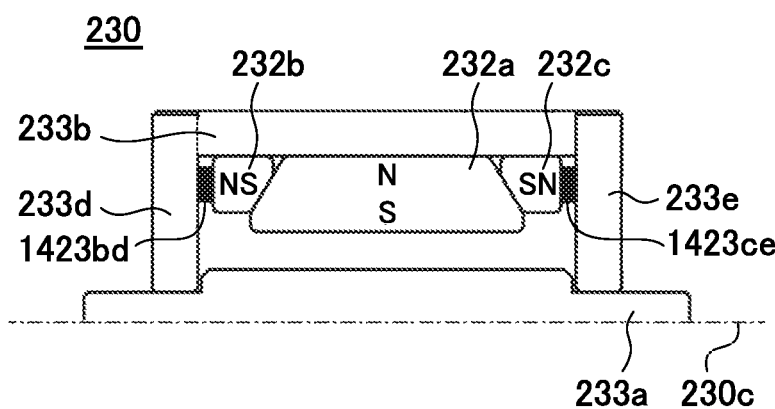
FIG. 14A and FIG. 14B are schematic views showing an auxiliary fixing structure of the magnet group of the linear motor according to the second embodiment.
Figure 14B:
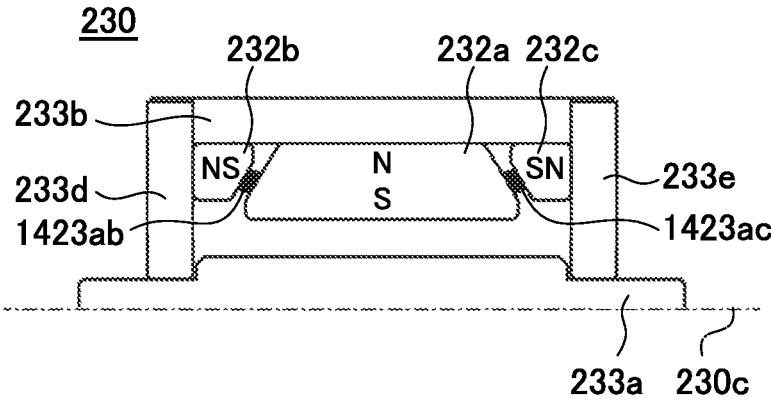

FIG. 14A and FIG. 14B are schematic views showing an auxiliary fixing structure of the magnet group of the linear motor 230.

As shown in FIG. 8A, the magnet group of the linear motor 230 of the first embodiment receives the attraction forces from the side yokes 233d and 233e as reactions of forces attracting the side yokes. The main magnet 232a in the magnet group is held by strong static friction force on the back yoke 233b. Accordingly, the magnet group is not moved easily by the attraction forces as-is. In the meantime, when the auxiliary fixing structure is provided, the magnet group is held more firmly, and impact resistance of the linear motor 230 is improved.

For example, in an example shown in FIG. 14A, compression support members 1423bd and 1423ce are provided in spaces between the sub magnets 232b, 232c and the side yokes 233d, 233e as the auxiliary fixing structure. The magnet group is supported by restoring forces of the compression support members 1423bd and 1423ce. The side yokes 233d and 233e are the components of the magnetic circuit 230b of the linear motor 230 and are attracted by the strong magnetic force toward the main magnet 232a. Accordingly, the restoring forces of the compression support members 1423bd and 1423ce do not break the magnetic circuit, and the stability of the magnetic circuit is maintained.

Alternatively, as shown in FIG. 14B, compression support members 1423ab and 1423ac may be provided in spaces between the main magnet 232a and the sub magnets 232b and 232c. In this case, the sub magnets 232b and 232c strongly stick to the side yokes 233d and 233e, respectively, and exert the attraction forces on the main magnet 232a. Since the main magnet 232a is pressed by the compression support members 1423ab and 1423ac and receives the static friction force from the back yoke 233b, the main magnet 232a does not move. The fixing structures shown in FIG. 14A and FIG. 14B may be used as a combination.

Figure 15A:
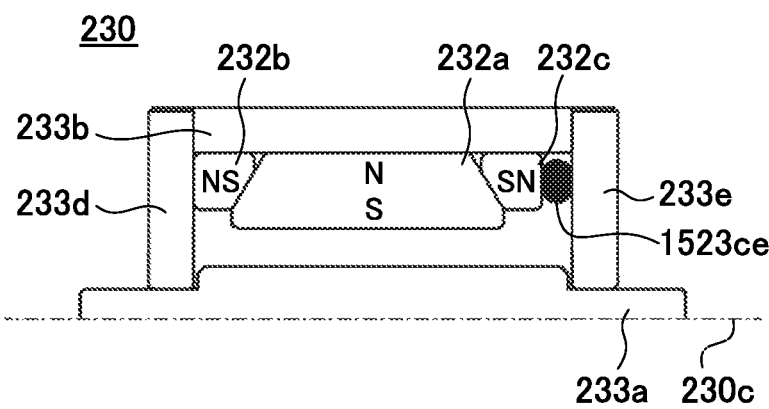
FIG. 15A and FIG. 15B are schematic views showing an example in which the magnet group of the linear motor according to the second embodiment is offset and is fixed.
Figure 15B:
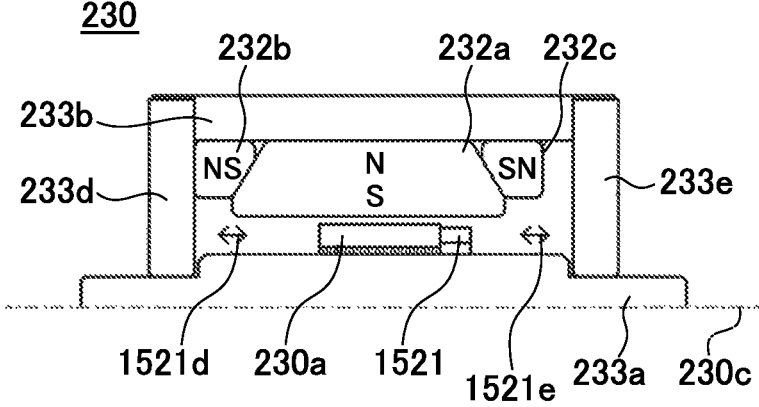

FIG. 15A and FIG. 15B are schematic views showing an example in which the magnet group of the linear motor 230 is offset and is fixed.

As shown in FIG. 15A, the magnet group of the linear motor 230 is brought near to one of the side yokes 233d and 233e beforehand. That is, the magnet group is offset from the center in the main axis direction 230c and is fixed. At this time, a compression support member is preferably provided in a space between the magnet group of one of the side yokes 233d and 233e of the linear motor 230. In the example in FIG. 15A, a compression support member 1523ce is provided between the sub magnet 232c and the side yoke 233e. In this case, since the magnet group is brought near to the side yoke 233d, when the magnet group sticks to the side yoke 233d beforehand as shown in FIG. 15A, the magnet group is supported with high rigidity. For example, even when a slight clearance remains due to assembly requirements, the clearance can be filled up with a thin compression support member with a high Young's modulus. Accordingly, it becomes easy to improve the rigidity in supporting the magnet group compared with the case where clearance remains.

As shown in FIG. 2 of the first embodiment, the coil unit 230a of the linear motor 230 supports a movable body (the lens holder 221 in the first embodiment) as a target to be fixed at one end in the main axis direction in many cases. Accordingly, in the linear motor 230, a supporting part of the movable body occupies a certain space in the main axis direction 230c equivalent to a stroke direction. Accordingly, in one end part of the stroke, a relative non-usable area in which the coil unit 230a does not come occurs because the supporting part comes compared with the other end part in many cases. On the contrary, in the other end part, a relative usable area in which the coil unit 230a comes to the end more occurs.

Accordingly, when the magnet group is offset-arranged, the magnet group is preferably offset to the side at which the usable area of the coil unit 230a occurs (the side of the other end part in the main axis direction 230c of the coil unit 230a). For example, as shown in FIG. 15B, the supporting part 1521 of the movable body shall be fixed to the right end of the coil unit 230a. In this case, an area 1521e in the right end part of the stroke becomes the above-mentioned non-usable area, and an area 1521d in the left end part of the stroke becomes the above-mentioned usable area. Since the magnetic efficiency in the area 1521d as the usable area is optimized by employing such an arrangement, the degradation of the efficiency in the stroke end part in the linear motor 230 is minimized.

According to the above-mentioned configuration, the linear motor that is suitable to practical use is provided by this embodiment.

Figures 16A, 16B, 16C:
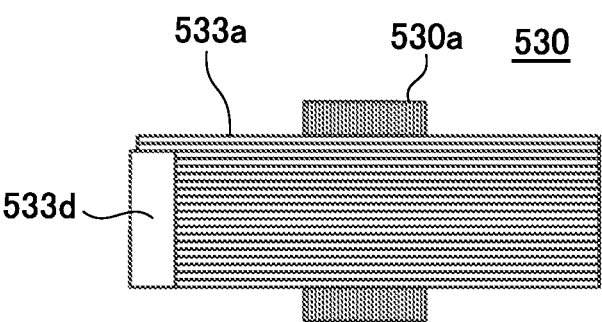
FIG. 16A, FIG. 16B, and FIG. 16C are schematic views showing a configuration of a linear motor according to a third embodiment.

Hereinafter, a third embodiment will be described. FIG. 16A, FIG. 16B, and FIG. 16C are schematic views showing a configuration of a linear motor 530 according to this embodiment. Hereinafter, an example in which the linear motor 530 of this embodiment is used for the lens barrel 200 instead of the linear motor 230 is shown.

In order to suit convenience of the description, last 2 digits of a reference numeral applied to a component of the linear motor 230 of the first embodiment are identical to that applied to a corresponding component of the linear motor 530 of this embodiment.

FIG. 16C is a sectional side view showing the linear motor 530 viewed from the outside of the focusing mechanism 220 in a radial direction. Moreover, FIG. 16A is a top view showing the linear motor 530 shown in FIG. 16C viewed from the upside by the third angle projection. FIG. 16B is a front view showing the linear motor 530 shown in FIG. 16C viewed from the left side by the third angle projection.

As shown in FIG. 16C, the linear motor 530 is provided with a coil unit 530a, a main magnet 532a, sub magnets 532b and 532c, a yoke (a U-shaped yoke is called henceforth) 533a of a U-shaped form, and a side yoke 533d in FIG. 16C.

The characteristic feature of the linear motor 530 according to this embodiment is that the U-shaped yoke 533a is an integral yoke that plays the role of the yoke group (the center yoke, back yoke, side yokes) of the linear motor 230 of the first and second embodiments. In FIG. 16C, the U-shaped yoke 533a is sectioned by dotted lines into a center yoke part 533aa, a back yoke part 533ab, and a side yoke part 533ae that achieve the function of the yoke group. Also in such a configuration, since the magnet group is arranged in the applied Hulbach array in the state where the magnets have the shapes of the present invention as shown in FIG. 16C, the power efficiency of the linear motor 530 is improved by improving the magnetic efficiency.

Moreover, the linear motor 530 of this embodiment does not have the configuration that the plurality of main magnets (232a, 232d) face the center yoke 233a from the plurality of directions as shown in the first embodiment. The linear motor 530 has the configuration that only the main magnet 532a faces the center yoke part 533aa from one direction as shown in FIG. 16C. Moreover, the coil unit 530a of this embodiment is not a solenoid coil of a circular section like the coil unit 230a of the first embodiment. The coil unit 530a has a square sectional shape as shown in FIG. 16B. In addition, coil units of various sectional shapes can be employed.

Moreover, the U-shaped yoke 533a of this embodiment is constituted by laminating many thin electromagnetic steel plates in the width direction that intersects perpendicularly with both the main axis direction 530c and the main magnetization direction of the main magnet 532a. Such a yoke structure is widely used in the field of motor, excels in electromagnetic high frequency characteristic, and also has high degree of freedom of the shape in the surface of a laminated steel plate. Accordingly, the height of the back yoke part 533ab in the main magnetization direction of the main magnet 532a in the stroke center part in the main axis direction 530c may be lowered than that in the stroke end parts as shown in FIG. 16 by taking advantage of this characteristic feature. In other words, the thickness of the back yoke part 533ab may be thinner in the stroke center part than the stroke end parts. That is, as shown in FIG. 16C, the center part of the main magnet 532a in the main axis direction 530c may be partially embedded into the back yoke 533ab (hereinafter referred to as an embedded form). The shape of the main magnet of which the side surfaces incline inward has good matching with such an embedded form. That is, since the variation of the height of the back yoke part 533ab is expressed by a continuous slant shape as shown in FIG. 16 instead of a discrete step shape, it becomes easier to improve the magnetic efficiency. When such a structure is employed, the height of the main magnet 532a of the linear motor 530 in the main magnetization direction is lowered, which improves miniaturization more.

Since the stroke center part of the back yoke part 533ab is an area in which the magnetic flux density is relatively small among the magnetic circuit, even if the height (thickness) of the back yoke part 533ab decreases in the stroke center par, the influence on magnetic efficiency is small. Accordingly, the miniaturization of the linear motor 530 is improved without large influence. Otherwise, as a reverse way of thinking, when the height of the back yoke part 533ab is increased in the stroke end parts in which the magnetic flux density is relatively large among the magnetic circuit, the magnetic efficiency is improved without enlarging the linear motor 530.

As described above, the configuration of the linear motor of the present invention is applicable with various modifications within the scope of the invention. For example, although the above-mentioned embodiments describe the example that uses the linear motor of the present invention as the motor of the focusing mechanism, the linear motor may be used as a motor of another lens driving mechanism, such as a zoom mechanism in a lens barrel. Moreover, the linear motor of the present invention is applicable to a drive device that linearly moves a driven member. Applicable apparatuses are not limited to optical apparatuses, such as a lens barrel and an image pickup apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-212512, filed Dec. 27, 2021, which is hereby incorporated by reference herein in its entirety.

What is claimed is:

1. A linear motor that generates thrust in a main axis direction, the linear motor comprising:

a coil that is arranged so that a winding core direction of the coil approximately coincides with the main axis direction;

a center yoke part that is arranged in an area inside the coil so as to extend in the main axis direction;

a main magnet that is arranged at a position approximately facing the center yoke part in an area outside the coil so that a main magnetization direction of the main magnet intersects perpendicularly with the main axis direction;

a back yoke part that is arranged so as to adjoin a magnetized surface of the main magnet that is opposite to a magnetized surface facing the center yoke in the main magnetization direction;

two sub magnets that approximately adjoin the main magnet and that are arranged in postures where main magnetization directions are inclined with respect to the main magnetization direction of the main magnet; and two side yoke parts that are arranged so as to approximately adjoin the center yoke part and the back yoke part at front and back positions of a magnet group including the main magnet and the two sub magnets in the main axis direction, wherein at least parts of surfaces of the main magnet that approximately adjoin the two sub magnets are inclined relative to the main magnetization direction of the main magnet, wherein at least parts of surfaces of the two sub magnets that approximately adjoin the main magnet are inclined relative to the main magnetization direction of the main magnet, wherein the two sub magnets are lower than the main magnet in a height in the main magnetization direction of the main magnet, and wherein the main magnet and the two sub magnets are mutually adhered and fixed by applying adhesive to spaces formed on a portion of the inclined surface of the main magnet and adjacent portions of the surfaces of the two sub magnets.

2. The linear motor according to claim 1, wherein the back yoke part is longer than the main magnet in a length in the main axis direction.

3. The linear motor according to claim 1, wherein a width of each of the two sub magnets is smaller than a width of the main magnet in a width direction that intersects perpendicularly with both the main axis direction and the main magnetization direction of the main magnet.

4. The linear motor according to claim 3, wherein the main magnet, the two sub magnets, and the back yoke part are mutually adhered and fixed by applying adhesive to spaces formed on a portion of the inclined surface of the main magnet at either end in the width direction and adjacent portions of the surfaces of the two sub magnets positioned at either end of the width direction.

5. The linear motor according to claim 1, further comprising compression support members arranged between the two sub magnets and the two side yoke parts.

6. The linear motor according to claim 1, further comprising compression support members arranged between the main magnet and the two sub magnets.

7. The linear motor according to claim 1, wherein the magnet group is positioned closer to one of the two side yoke parts than to the other side yoke part.

8. The linear motor according to claim 7, further comprising:

a movable body; and a supporting part that is fixed to one end of the coil in the main axis direction and that supports the movable body, wherein the magnet group is offset to a side of another end of the coil in the main axis direction.

9. The linear motor according to claim 1, wherein the coil is arranged so as to be movable relative to both the magnet group and a yoke group including the center yoke, the back yoke, and the side yokes in the main axis direction.

10. The linear motor according to claim 1, wherein a height of the back yoke part in the main magnetization direction of the main magnet is lowered in a center area in the main axis direction than both end areas.

11. A lens barrel comprising:

a lens;

a lens holder that holds the lens and is movable in an optical axis direction of the lens;

a fixed part that supports the lens holder so as to be movable;

a linear motor that generates thrust in the optical axis direction to drive the lens holder, the linear motor comprising:

a coil that is arranged so that a winding core direction of the coil approximately coincides with the optical axis direction;

a center yoke part that is arranged in an area inside the coil so as to extend in the optical axis direction;

a main magnet that is arranged at a position approximately facing the center yoke part in an area outside the coil so that a main magnetization direction of the main magnet intersects perpendicularly with the optical axis direction;

a back yoke part that is arranged so as to adjoin a magnetized surface of the main magnet that is opposite to a magnetized surface facing the center yoke in the main magnetization direction;

two sub magnets that approximately adjoin the main magnet and that are arranged in postures where main magnetization directions are inclined with respect to the main magnetization direction of the main magnet; and two side yoke parts that are arranged so as to approximately adjoin the center yoke part and the back yoke part at front and back positions of a magnet group including the main magnet and the two sub magnets in the optical axis direction, wherein at least parts of surfaces of the main magnet that approximately adjoin the two sub magnets are inclined relative to the main magnetization direction of the main magnet, and wherein at least parts of surfaces of the two sub magnets that approximately adjoin the main magnet are inclined relative to the main magnetization direction of the main magnet, wherein the two sub magnets are lower than the main magnet in a height in the main magnetization direction of the main magnet, wherein the main magnet and the two sub magnets are mutually adhered and fixed by applying adhesive to spaces formed on a portion of the inclined surface of the main magnet and adjacent portions of the surfaces of the two sub magnets, and wherein one of the coil and a magnetic circuit, which includes the main magnet, the two sub magnets, the center yoke part, the back yoke part, and the side yoke parts, is fixed to the fixed part, and another of the coil and the magnetic circuit is fixed to the lens holder.

12. A drive device comprising:

a movable body;

a fixed part that supports the movable body so as to be movable in a predetermined direction;

a linear motor that generates thrust in the predetermined direction to drive the movable body, the linear motor comprising:

a coil that is arranged so that a winding core direction of the coil approximately coincides with the predetermined direction;

a center yoke part that is arranged in an area inside the coil so as to extend in the predetermined direction;

a main magnet that is arranged at a position approximately facing the center yoke part in an area outside the coil so that a main magnetization direction of the main magnet intersects perpendicularly with the predetermined direction;

a back yoke part that is arranged so as to adjoin a magnetized surface of the main magnet that is opposite to a magnetized surface facing the center yoke in the main magnetization direction;

two sub magnets that approximately adjoin the main magnet and that are arranged in postures where main magnetization directions are similarly inclined with respect to the main magnetization direction of the main magnet; and two side yoke parts that are arranged so as to approximately adjoin the center yoke part and the back yoke part at front and back positions of a magnet group including the main magnet and the two sub magnets in the predetermined direction, wherein at least parts of surfaces of the main magnet that approximately adjoin the two sub magnets are inclined relative to the main magnetization direction of the main magnet, wherein at least parts of surfaces of the two sub magnets that approximately adjoin the main magnet are inclined relative to the main magnetization direction of the main magnet, wherein the two sub magnets are lower than the main magnet in a height in the main magnetization direction of the main magnet, and wherein the main magnet and the two sub magnets are mutually adhered and fixed by applying adhesive to spaces formed on a portion of the inclined surface of the main magnet and adjacent portions of the surfaces of the two sub magnets, and wherein one of the coil and a magnetic circuit, which includes the main magnet, the two sub magnets, the center yoke part, the back yoke part, and the side yoke parts, is fixed to the movable body, and another of the coil and the magnetic circuit is fixed to the fixed part.

* * * * *